United States Patent [19]

Kobayashi

[11] 4,236,799
[45] Dec. 2, 1980

[54] UNWINDING-MECHANISM RELEASING DEVICE FOR USE IN A CAMERA

[75] Inventor: Takumi Kobayashi, Tokyo, Japan

[73] Assignee: Asahi Kogaku Kogyo Kabushiki Kaisha, Tokyo, Japan

[21] Appl. No.: 911,579

[22] Filed: Jun. 1, 1978

[30] Foreign Application Priority Data

Jun. 1, 1977 [JP] Japan ................... 52-64221

[51] Int. Cl.³ .................. G03B 1/24; G03B 17/42
[52] U.S. Cl. ................................ 354/209; 354/212
[58] Field of Search ............................ 354/209, 234

[56] References Cited

U.S. PATENT DOCUMENTS

| 3,762,297 | 10/1973 | Kitai | 354/234 |
| 4,017,875 | 4/1977 | Yamamichi | 354/209 |

Primary Examiner—J. V. Truhe
Assistant Examiner—Shelley Wade
Attorney, Agent, or Firm—Sughrue, Rothwell, Mion, Zinn and Macpeak

[57] ABSTRACT

Shifting of the image plane during multiple exposure photography is prevented by releasing the unwinding button and a film locking member after the shutter operation. The release mechanism is preferably operated by an electromagnet used in the shutter operation.

1 Claim, 3 Drawing Figures

UNWINDING-MECHANISM RELEASING DEVICE FOR USE IN A CAMERA

BACKGROUND OF THE INVENTION

This invention relates to an unwinding-mechanism releasing device for use in a camera. Hitherto, it has been a common practice for the device of the type described, upon unwinding of a film or the multiple exposure photography, to bring a clutch mechanism interposed between a winding mechanism and a sprocket into a disengaged condition by depressing an unwinding button, with the unwinding button being locked and hence retained in the position thus assumed. Many such unwinding devices of this type have been proposed, most of which utilize an automatic releasing means adapted to release an unwinding button from its locked condition. In most cases, however, a locking member is so designed as to be released at the end of the winding operation but before shutter release. This, however, offers shortcomings in that there sometimes arises a shifting or misalignment of an image plane on a film for example due to slightly premature release or, when the film reaches its end in the course of winding operation and is then stopped in the position at which the aforenoted locking member is released, there is a danger that the unwinding button will be impossible to lock for multiple exposure operation.

SUMMARY OF THE INVENTION

The present invention is directed to avoiding the aforenoted shortcomings by utilizing the operation of a shutter release electro magnet for also releasing an unwinding mechanism in a camera.

Thus, the unwinding mechanism is released after the shutter release so that no shifting of the image film will occur due to premature release. The electromagnet may be one for operating any of the shutter release members, for example the leading curtain, trailing curtain, mirror or diaphragm operating electromagnets. Linkage is provided for positively returning the locking mechanism to its charged state after each release operation.

DETAILED DESCRIPTION OF THE INVENTION

Figure 1:
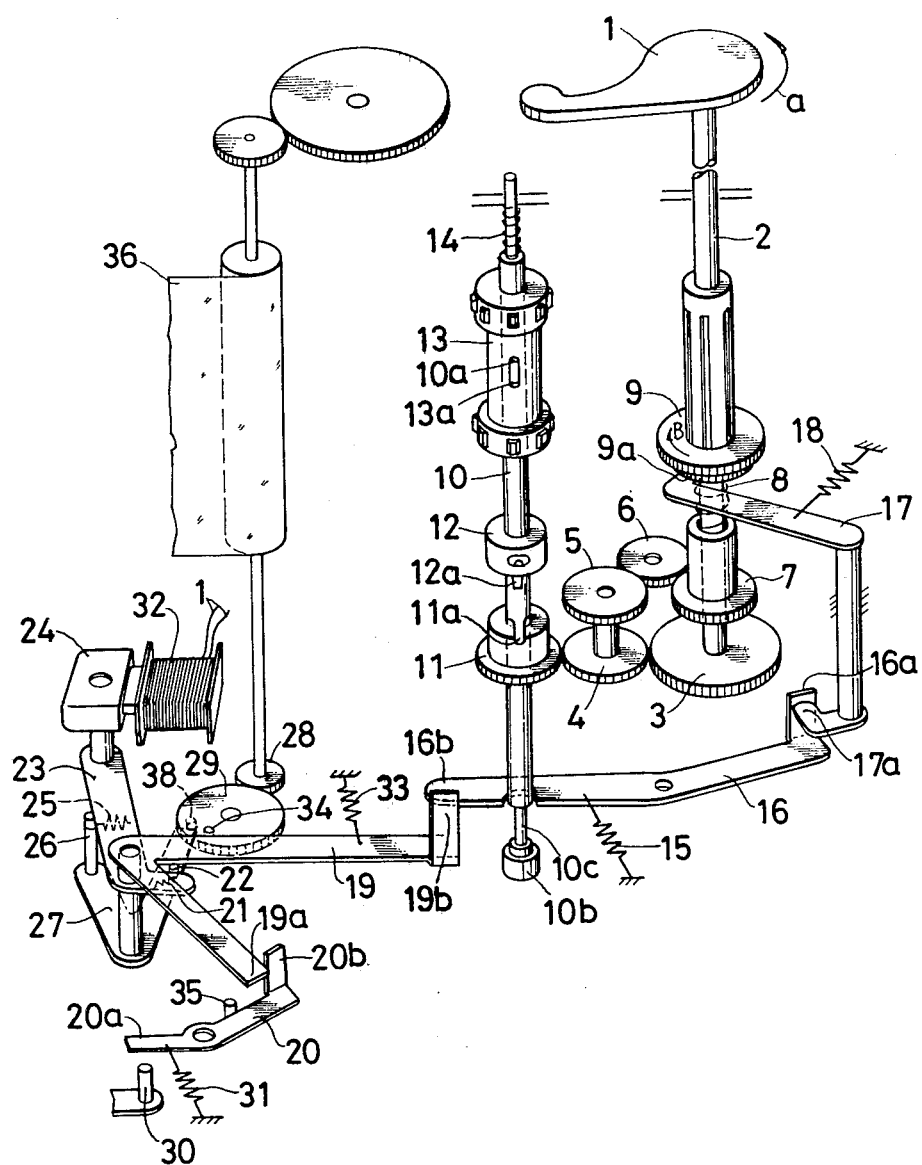
FIG. 1 is a perspective view of a film-unwinding device showing one embodiment of the invention.

One embodiment of the present invention will now be described with reference to the accompanying drawings. Shown at 1 is a winding lever which is so designed as to cooperate with a winding shaft 2 through the medium of a known type one-way clutch. A gear 3 is secured on the winding shaft 2 integrally, and is so designed as to cooperate with a take-up spool 9 which is rotatably supported on the winding shaft 2 and receives a winding power through the medium of a friction spring 8 and from the gears 4 to 7, while the gear 4 cooperates with a gear 11 which is rotatably supported on a sprocket shaft 10. The gear 11 is clutch-coupled to a cam 12 secured on the sprocket shaft 10 through the medium of a groove 11a provided in the gear 11 and a projection 12a formed on the cam 12, while cooperating with a sprocket 13 through the medium of a pin 10a and an elongated hole 13a. The sprocket shaft 10 is loaded downwards by means of a spring 14, thereby bringing an unwinding button 10b secured to the lower end of the sprocket shaft 10 into an outward projecting position. When the unwinding button 10b is depressed against the action of the spring 14, then a locking member 16 which is so loaded as to rotate counterclock-wise under the action of a spring 15 is rotated so as to fit on a small-diameter portion 10c of the sprocket shaft 10, thereby maintaining the sprocket shaft 10 in a pushed condition, with the result that the projection 12a is disengaged from the groove 11a in the aforenoted clutch mechanism. Thus, the sprocket 13 is disengaged from the aforenoted winding wheel train, while a bent portion 16a of the locking member 16 is disengaged from one end 17a of an arresting member 17. As a result, the arresting member 17 is rotated clockwise under the action of a spring 18 so as to mesh with a ratchet wheel 9a integral with the take-up spool 9. This prevents the rotation of the spool 9 to take up a film i.e., in an arrow direction b, whereas the spool 9 is maintained in a condition to be able to rotate counterclockwise to unwind the film, thus allowing the film to be unwound. Furthermore, even in case the winding lever 1 is rotated in the direction of an arrow a, the spool will not take up the film, but a shutter mechanism alone may still be charged, thereby enabling multiple-exposure photography.

The aforenoted arrangement is known. However, according to the present invention the aforenoted clutch mechanism may be locked in a disengaged condition or the film winding device may be released from its arrested condition for resuming the normal photographing condition by the operation of an electromagnet 32 which controls a trailing curtain in a shutter mechanism.

Stated differently, upon completion of the winding operation, one end 19a of a second operating lever 19 is retained in position against the force of spring 33 by means of a retaining member 20, so that the second operating lever 19 cooperates with a first operating lever 23 through the medium of a spring 21 and a pin 22 to mechanically charge an armature by rotating the lever 23 clockwise. The first operating lever 23 is operably connected to a control member 27 through the medium of a spring 25 and a pin 26, while the control member 27 cooperates with a trailing curtain pinion 28 and a pin 38 on the lower surface of the gear 29 to lock the interlocking gear 29 which, in turn, is adapted to rotate less than one full turn of its rotation in cooperation with the travelling of a trailing curtain. After the releasing operation of a shutter, the electromagnet 32 is excited, so that a pin 30 secured on a member cooperative with the lifting movement of a mirror in a known mirror box (not shown) hits or strikes one end 20a of the retaining member 20 against the action of a spring 31 at the termination of the lifting movement of a mirror, thereby rotating the retaining member clockwise, so releasing the second operating lever 19 from the engagement with the bent portion 20b of the retaining member 20, with the result that the electromagnet 32 may be released from its mechanically charged condition. However, the first operating lever 23 is retained in position, due to the attracting action of the electromagnet 23, while the second operating lever 19 as well is retained in position by abutment of the pin 22 secured on the first operating lever 23, against the action of the spring 33. A given time (given seconds) after the starting of travelling of a leading curtain for a shutter (not shown), the electromagnet 32 is deenergized; the armature 24 is detached from the electromagnet 32; the first operating lever 23 is rotated counterclockwise under the action of the spring 33 so as to abut the pin 26 secured on the control member 27 to rotate the control member 27 counterclockwise, thereby releasing the interlocking gear 29 from its locked condition, thus allowing the trailing curtain 36 to start travelling, while the second operating lever 19 as well abuts the pin 22 so as to be rotated counter clockwise, with the result that one end 16b of the locking member 16 is struck by the bent portion 19b, thereby rotating the locking member 16 clockwise against the action of the spring 15. The locking member 16 is then disengaged from the small-diameter portion 10c; the sprocket shaft 10 is lowered under the action of the spring 14; the bent portion 16a of the locking member 16 pushes on one end 17a of the arresting member 17 to rotate the arresting member 17 counterclockwise so as to be disengaged from the ratchet wheel 9a; and the sprocket 13 and take-up spool 9 are thus returned to their winding conditions. In addition, at the termination of travelling of the trailing curtain 36, the pin 34 secured on the interlocking gear 29 strikes the second operating lever 19 against the action of the spring 33, thereby rotating the second operating lever 19 clockwise, and rotating the first operating lever 23 clockwise so as to mechanically charge the armature 24, after which, due to the returning action of a known mirror box, the pin 30 is detached from one end 20a of the retaining member 20, so that the retaining member is rotated counterclockwise until the retaining member 20 abuts a stopper 35 under the action of the spring 31, with the result that the bent portion 20b of the retaining member 20 locks one end 19a of the second operating lever 19, thus completing the mechanical charging so as to allow the subsequent winding operation. Furthermore, with the aforenoted unwinding mechanism-releasing portion and electromagnet portion, the first operating lever 23 and the second operating lever 19 may comprise a single operating lever 37.

Figure 2:
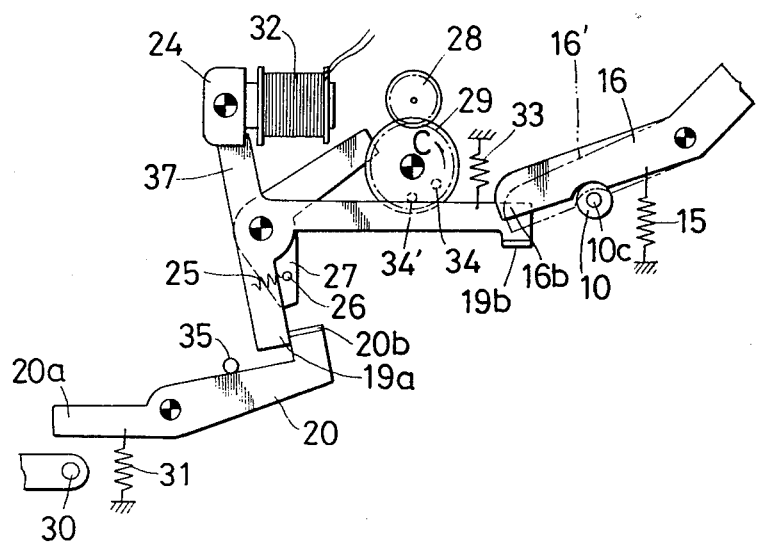
FIG. 2 is a plan view illustrative of the operation of the unwinding-mechanism releasing portion and the electromagnet mechanism, prior to the operation of an electromagnet.
Figure 3:
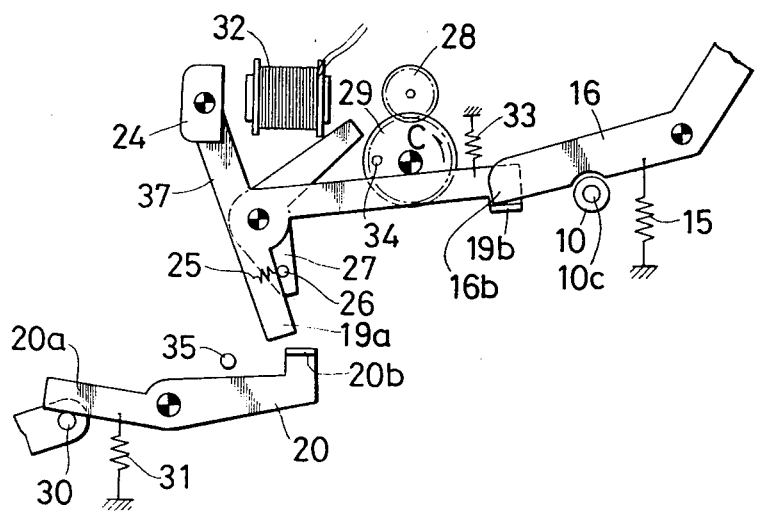
FIG. 3 is a plan view illustrative of the operation of the unwinding-mechanism releasing portion and the electromagnet mechanism, after the operation of the electromagnet.

FIGS. 2 and 3 show the operations of the unwinding-mechanism releasing portion and electromagnet mechanism. Referring to FIG. 2, when the aforenoted clutch mechanism is maintained in its disengaged condition due to the depressing operation of an unwinding button, the locking member 16 remains in a position 16'. As has been described earlier, due to the winding operation by means of the winding lever 1, the shutter mechanism alone may be charged; the interlocking gear 29 is rotated clockwise so as to be locked by the control member 27 and pin 38; the pin 34 is moved from a position 34' to a position 34; one end 19a of the operating lever 37 is locked by the bent portion 20b of the retaining member 20; and the armature 24 is retained in an attracted position in an electromagnet mechanism.

Referring to FIG. 3, as has been described earlier, the pin 30 strikes the end 20a of the retaining member 20 due to the releasing operation of a shutter at the termination of the lifting movement of a mirror, against the action of the spring 31, thereby rotating the retaining member 20 clockwise, so that the operating lever 37 is released from its retained condition by means of the bent portion 20b of the retaining member 20. However, the operating lever 37 is retained in position due to the attracting force of the electromagnet 32. A given time (given seconds) after the starting of the travelling of a leading curtain for a shutter (not shown), the electromagnet 32 is de-energized according to an electric signal, so that the armature may be detached from the electromagnet 32; the operating lever 37 is then rotated counterclockwise under the action of the spring 33 so as to abut the pin 26 secured on the control member 27, thereby rotating the control member 27 counterclockwise; then after the control member 27 has been released from the locked condition on the interlocking gear 29, the trailing curtain starts travelling, while one end 16b of the locking member 16 is struck by the bent portion 19b of the operating lever 37, so that the locking member 16 is rotated clockwise against the action of spring 15, and then the locking member 16 is disengaged from the small-diameter portion 10c, with the result that, as has been described earlier, the sprocket 13 and spool 9 are returned to their winding conditions, respectively. In addition, upon the travelling of the trailing curtain 36, the interlocking gear is rotated in an arrow direction c; the pin 34 secured on the interlocking gear 29 is moved to the position 34' in FIG. 2, so as to hit the operating lever 37 against the action of the spring 33, thereby rotating the control lever 37 clockwise. Then, as a result, the armature 24 is rotated to an attracted position, after which due to the returning action of a known type mirror box (not shown), the pin 30 may be detached from one end 20a of the retaining member, so the retaining member 20 is rotated counterclockwise until the member 20 abuts the stopper 35 under the action of the spring 31; then, one end 19a of the operating lever 37 is locked by the bent portion 20b, thus completing the mechanical charging, and allowing the subsequent winding operation.

Description has been given of the embodiment according to the present invention, in which the sprocket shaft is released from engagement with the locking member through the medium of the operating lever by utilizing a counteraction or repelling action against the magnetic force of an electromagnet adapted to control a trailing curtain. However, it is needless to mention that the aforenoted arrangement may be replaced by the use of an attracting force or action of the electromagnet. In addition, the sprocket shaft may be released from the engagement with the locking member by utilizing the operation of an electromagnet adapted to release a leading curtain, the operation of an electromagnet for releasing a mirror in the case of the known so-called electromagnetic releasing operation, or the operation of the operating lever due to an electromagnet adapted to control an aperture in an EE camera.

As is apparent from the foregoing description of the invention, an unwinding mechanism may be released and the winding device for a film may be released from its arrested condition by simple means, without the provision of a special type releasing-operating member and other complex members which might cause the loss of an unwinding function at the end of the film. In addition, the clutch mechanism is released from its locked, and disengaged condition by the operation of an electromagnet, so that the locking member serves as a brake for an operating force of the electromagnet, thereby eliminating a detrimental influence on an electromagnet mechanism, and there is freedom from the shifting or misalignment of an image plane upon multiple-exposure photography unlike the prior art in which the unwinding mechanism is released at the termination of a winding operation.

What is claimed is:

1. An unwinding-mechanism releasing device for use in a camera of the type having a clutch mechanism interposed between a winding mechanism and a sprocket, said mechanism being brought into engaged and disengaged conditions, and a locking member movable between a first position and a second position in which it retains said clutch mechanism in a disengaged condition, and an electromagnet for releasing a shutter, the improvement comprising:

first biasing means for biasing said locking member toward said second position;

a pivotably mounted operating member pivotable between a releasing position in which it retains said locking member in its first position and a locking position in which said locking member is permitted to assume said second position, said operating member being retained in said locking position by said electromagnet until the end of the shutter operation at which time the electromagnet is operated to permit movement of said operating member from its locking position to its release position;

gear means rotatable during shutter operation and having a pin thereon which, when said gear means is permitted to rotate, will abut said operating member at the end of rotation of said gear means to thereby urge said operating member to its locking position;

a control member pivotably mounted coaxially with said operating member and pivotable between a first position in which rotation of said gear means is permitted and a second position in which an end portion of said control member engages and prevents rotation of said gear means;

means for biasing said control member toward its second position;

abutment means on said control member for engaging said operating member so that said control member will be moved to its first position by said operating member when said operating member moves to its release position;

retaining means movable between a first position, in which it holds said operating member in its release position, and a second position in which it releases said operating member, said retaining means being biased toward its first position; and means for moving said retaining means to its second position at the termination of lifting movement of a mirror, thereby mechanically releasing said operating member to thereby permit said operating member, when released by said electromagnet, to move to said release position under the force of said first biasing means, thereby moving said control member to its first position and permitting rotation of said gear means, said abutment means engaging said operating member at the completion of shutter operation to thereby move said operating member back to its locking position.

* * * * *